I. H. LEVIN.
ELECTRODE.
APPLICATION FILED APR. 21, 1919. RENEWED APR. 23, 1920.
1,360,545. Patented Nov. 30, 1920.
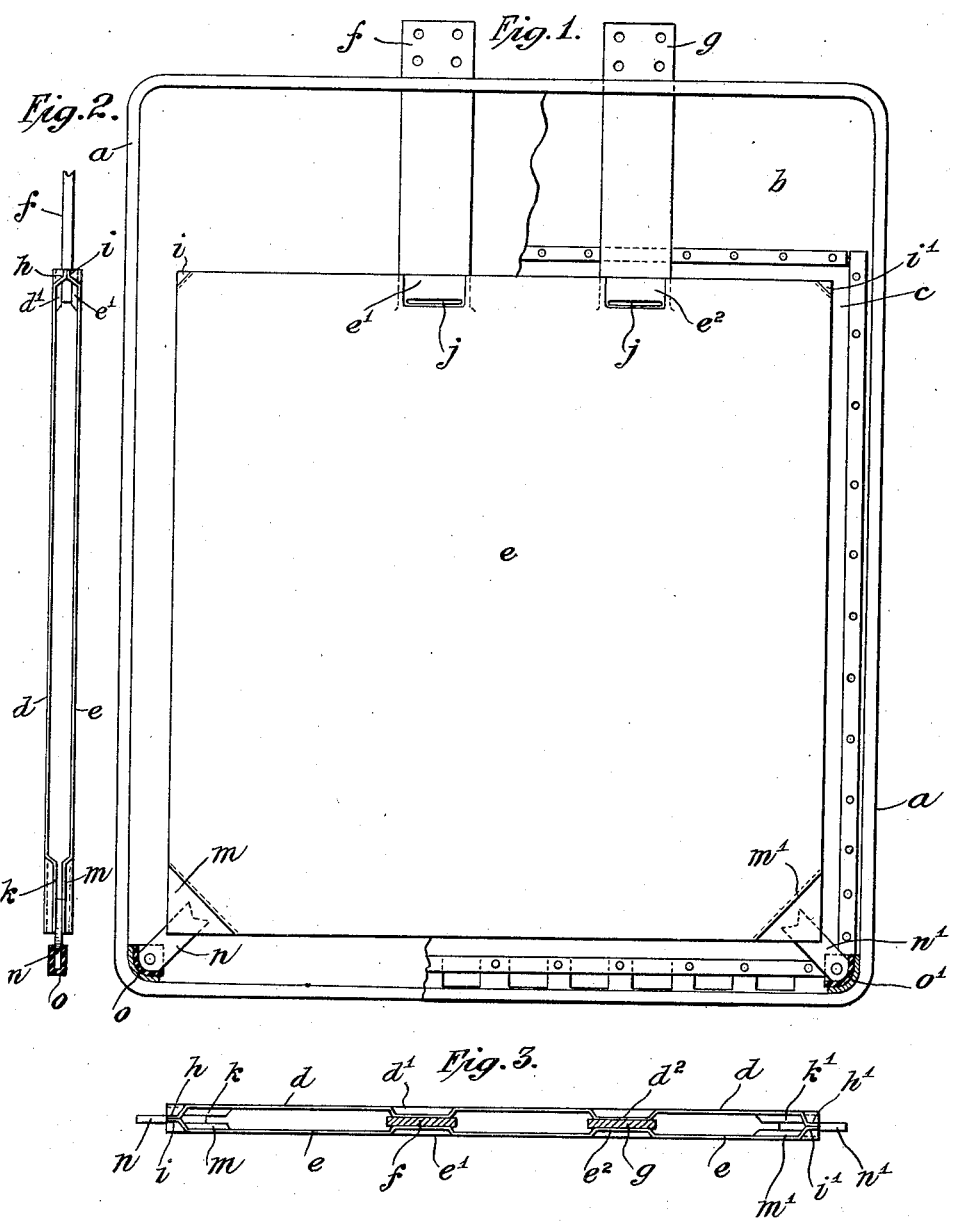

UNITED STATES PATENT OFFICE.

ISAAC H. LEVIN, OF NEW YORK, N. Y.

ELECTRODE.

1,360,545.  Specification of Letters Patent.  Patented Nov. 30, 1920.

Application filed April 21, 1919, Serial No. 291,646. Renewed April 23, 1920. Serial No. 376,171.

*To all whom it may concern:*

Be it known that I, ISAAC H. LEVIN, a citizen of the United States, residing at the borough of Manhattan, in the city, county, and State of New York, have invented certain new and useful Improvements in Electrodes, of which the following is a specification, reference being had therein to the accompanying drawings, which form a part thereof.

My invention relates to electrodes, and more particularly to a type thereof adapted for use in multiple unit uni-polar cells in the production of oxygen and hydrogen.

In cells of this type, there is associated in the generator an electrode of one polarity coöperating with electrodes of the opposite polarity, arranged upon each side thereof. Cells of this character are used in batteries, it being highly desirable to make each cell or unit as compact as possible to economize floor space and facilitate the handling of the cell. The gap between electrodes, the bulk of the metal entering thereinto, and the construction of electrodes, are all important factors in controlling the resistance in the cell, upon which the efficiency of the cell is in a measure dependent.

In an electrode made in accordance with my invention, the active area of the electrode is composed of sheet metal plates adapted to be submerged in the electrolyte in the cell, these plates being secured to a particular form of terminal, the cross-sectional area of which may be so proportioned as to avoid undue resistance to the electrical current while permitting the terminal to be made of any desired length and avoid the necessity for increasing the width of the cell to accommodate the terminal.

This terminal being made of a different metal stock from the electrode plates, is permanently united therewith in a manner to insure the desired effective contact area between it and the plates, and at the same time avoid any likelihood of the seepage of the electrolyte between it and the plates in a manner to interpose a resistance body at this point and interfere with an effective distribution of the current, to both plates. The terminal is of uniform dimensions throughout, thus cutting down the metal loss.

The terminal bar is secured to the plates by autogeneous welding, the construction and arrangement of parts being such that the desired union of the parts is secured without metal, other than that in the bar and in the plates, a method of welding being permissible with this construction which will not only insure the desired electrical contact areas, but will prevent electrolyte from entering between the terminal bar and the plates.

I also so construct the plates that when the electrode is assembled and ready for use, said plates will be mechanically and electrically connected at the corners thereof in a manner to not only have the plates maintained at a desired predetermined distance apart, but to secure the desired distribution of the current passing through both plates.

Electrodes made in accordance with my invention are so constructed that they may be manufactured in quantities and each electrode will be substantially identical with every other electrode, so that in a battery using cells equipped with such electrodes, the electrical conditions will be substantially identical.

The invention consists primarily in an electrode composed of two sheet metal plates having oppositely disposed depressions adjacent the top thereof respectively, and a flat metal terminal bar of substantially the same width as said depressions positioned therebetween and welded thereto; and in such other novel features of construction and combination of parts as are hereinafter set forth and described, and more particularly pointed out in the claims hereto appended.

Referring to the drawings,

Figure 1 is a sectional view of an electrolytic cell illustrating an elevation of an electrode made in accordance with my invention;

Fig. 2 is an end view of said electrode; and

Fig. 3 is a plan view thereof.

Like letters refer to like parts throughout the several views.

In the embodiment of my invention shown in the drawings, the electrode casing is shown at $a$, a diaphragm frame at $b$, and the diaphragm therein at $c$.

The electrode shown in the drawings is the middle electrode of a multiple unit unipolar cell, my invention relating more particularly to this electrode. As shown in the drawings, this electrode consists of two similar sheet metal plates $d$ and $e$ having the desired surface area as determined by the type of cell in which the electrode is to be used. While these plates are shown as being flat and imperforate, they may be made of any desired cross section and have openings therethrough, if desired.

Said plates $d$ and $e$, adjacent the top thereof, are provided with oppositely disposed depressions $d'$—$d^2$ and $e'$—$e^2$ formed from the metal of the said plates, the depth of these depressions being such as to form, intermediate the plates, a narrow gap of sufficient width to receive the terminal bars $f$ and $g$, two of which are shown in the accompanying drawings. In cells using an electrode of smaller area than that shown in the drawings, but one terminal bar is required.

The terminal bars $f$ and $g$ are shown as being of flat metal stock of uniform cross section throughout, the dimensions of these bars being proportioned to their length in order to minimize their electrical resistance and thus prevent current loss at this point.

The lower end of the bars $f$ and $g$ terminate adjacent the lower portion of the depressions $d'$—$d^2$ and $e'$—$e^2$ respectively, causing a contact area between the plates and the terminals co-extensive with the area of said depressions, the bottom of said depressions being flat so as to meet the sides of said terminal bars.

To secure the desired intimate electrical contact between said plates and said bars, I secure these parts together by welding, the spacing apart of the plates about the depressions, permitting access thereto for this purpose.

Since the electrode in its entirety is entirely immersed in the electrolyte, there has heretofore always been likelihood of the electrolyte seeping between the plates and the terminal bar, thus interposing a resistance at this point, and causing corrosion of parts to an extent to seriously impair the efficiency of a cell.

To meet this condition, I form the weld joint between the plates and the electrode, about the edges of said depression, the fused metal forming a barrier which excludes electrolyte from between the contact areas of said depressions and said bar. Owing to the inaccessibility of the lower edge of the bar and the bottom of the depression, I form at this point in each depression, a slot $h$ of substantially the width of the contact area of the depression, thus exposing the bar therethrough and permitting a weld joint to be made about this slot which will form a metal barrier at this point.

In order to permit the union of the metals of the bar and of the plates by means of an autogenous welding operation, the width of the bar is made slightly greater than that of said depressions, thus affording excess metal stock in the bar, which may be readily fused without interfering with the predetermined contact areas of said depressions.

To prevent warping of the plates $d$—$e$, or their movement in relation to each other or their associated electrode, I connect said plates together, using the stock of the plates themselves for this purpose, thus insuring a positive electrical connection between the plates, and insuring their acting as a unit in the distribution of the current so that a similar amount of current will flow through each plate.

The plates $d$—$e$ are usually quadrilateral to secure the maximum area, and to secure the desired union of said plates, I offset each upper corner thereof as at $h$—$h'$—$i$—$i'$, the offsets $h$—$i$ and $h'$—$i'$ meeting intermediate the plates and being welded together. The lower corners thereof are also offset as at $k$—$k'$—$m$—$m'$ but to a lesser degree so as to receive between them the supports $n$—$n'$ to which they are welded. The area of each lower offset is greater than that of the upper offset, so as to receive the said supports. The use of such supports, and of the insulating tips $o$—$o'$ therefor, considered broadly, form no part of my present invention, which relates more particularly to the use of such supports for effecting a uniform distribution of the current throughout both plates, and for helping to preserve a definite relative position of the plates.

The various offsets may be so proportioned to cause the plates to occupy a vertical plane, or any desired angle thereto, the desired result being a permanent positioning of the plates in relation to each other, and contact surfaces mechanically and electrically connected in a manner to avoid the electrolyte entering between same and presenting a resistance body which might cause a difference in the charge of electricity in the plates, or prevent the free flow of current from one plate to the other to effect an equalization of the charges in the plates.

An electrode made in accordance with my invention presents the desirable characteristic, that all plates for use in the different cells of a battery may be made so as to be substantially identical, thus insuring uniformity in the width of each electrode and the same electrical conditions in all similar electrodes of the same polarity embodied in the cell.

By using a flat terminal bar united with the plates in the manner described, I not only secure the proper electrical connection between the terminal and the plates of the electrode as heretofore referred to, but the cross-sectional area of the terminal bar may be increased by varying one dimension only of the bars and the length of the depressions in the plates co-acting therewith, which variance may be effected without necessitating any increase in the thickness of the cell.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An electrode composed of two sheet metal plates having oppositely disposed depressions adjacent the top thereof respectively, and a flat metal terminal bar of substantially the same width as said depressions positioned therebetween and welded thereto.

2. An electrode composed of two sheet metal plates, and a terminal bar secured thereto, said plates being spaced apart a predetermined distance and mechanically and electrically connected by means of offset portions thereof projecting toward each other and welded together.

3. An electrode composed of two sheet metal plates having oppositely disposed depressions adjacent the top thereof respectively, and a flat metal terminal bar of substantially the same width as said depressions positioned therebetween and welded thereto, said plates being spaced apart a predetermined distance and mechanically and electrically connected by means of offset portions thereof projecting toward each other and welded together.

4. An electrode composed of two sheet metal plates having oppositely disposed depressions adjacent the top thereof respectively, and a flat metal terminal bar of substantially the same width as said depressions positioned therebetween, said plates and said bar being mechanically and electrically connected by a weld joint extending continuously about the edges of said depressions, whereby electrolyte is excluded from between said plates and said bar.

5. An electrode composed of two sheet metal plates having two oppositely disposed depressions adjacent the top thereof respectively, said depressions, toward the bottom thereof, having a slot extending therethrough of substantially the entire width thereof, and a flat metal terminal bar of substantially the same width as said depressions positioned therebetween, said plates and said bar being electrically and mechanically connected by a weld joint about three edges of said depressions and about one edge of said slot, whereby electrolyte is excluded from between said plates and said bar.

6. An electrode composed of two sheet metal, quadrilateral plates, and a terminal bar secured thereto, said plates being spaced apart a predetermined distance and mechanically and electrically connected by means of offset upper corners projecting toward each other and welded together, and offset lower corners adapted to receive therebetween supports for the plates, and supports positioned between the offset at said lower corners and welded thereto.

7. An electrode composed of two sheet metal, quadrilateral plates having oppositely disposed depressions adjacent the top thereof respectively, said depressions toward the bottom thereof having a slot extending therethrough of substantially the entire width thereof, and a flat metal terminal bar of substantially the same width as said depressions positioned therebetween, said plates and said bar being electrically and mechanically connected by a weld joint about three edges of said depressions and about one edge of said slot, whereby electrolyte is excluded from between said plates and said bar, said plates being spaced apart a predetermined distance and mechanically and electrically connected by means of offset upper corners projecting toward each other and welded together, and offset lower corners adapted to receive therebetween supports for the plates, and supports positioned between the offset at said lower corners and welded thereto.

8. An electrode composed of two sheet metal plates having oppositely disposed depressions adjacent the top thereof respectively, and projecting toward each other, and a metal terminal bar symmetrical with said depressions, positioned therebetween and welded thereto.

In witness whereof I have hereunto affixed my signature, this 19th day of April, 1919, in the presence of two subscribing witnesses.

ISAAC H. LEVIN.

Witnesses:
F. T. WENTWORTH,
A. E. RENTON.